United States Patent [19]
Kelch et al.

[11] Patent Number: 5,137,343
[45] Date of Patent: Aug. 11, 1992

[54] MULTIFOCAL SURFACE FOR A MULTIFOCAL SPECTACLE LENS

[75] Inventors: Gerhard Kelch, Aalen; Hans Lahres; Helmut Wietschorke, Aalen-Wasseralfingen, all of Fed. Rep. of Germany

[73] Assignee: Carl-Zeiss-Stiftung, Heidenheim, Fed. Rep. of Germany

[21] Appl. No.: 688,111

[22] Filed: Apr. 19, 1991

[30] Foreign Application Priority Data

Apr. 19, 1990 [DE] Fed. Rep. of Germany ....... 4012609

[51] Int. Cl.$^5$ .............................................. G02C 7/06
[52] U.S. Cl. .................................................. 351/169
[58] Field of Search ............... 351/168, 169, 170, 171, 351/172

[56] References Cited

U.S. PATENT DOCUMENTS

| | | | |
|---|---|---|---|
| 3,687,528 | 8/1972 | Maitenaz | 351/169 |
| 4,606,622 | 8/1986 | Fueter et al. | 351/169 |
| 4,729,651 | 3/1988 | Kitani | 351/169 |
| 4,778,266 | 10/1988 | Maitenaz | 351/169 |
| 4,934,808 | 6/1990 | Kitani | 251/169 |

OTHER PUBLICATIONS

"Neue Progressive Flächen" by G. Guilino and R. Barth, DOZ Nr. 11 Nov. 20, 1980.

*Primary Examiner*—Scott J. Sugarman
*Attorney, Agent, or Firm*—Walter Ottesen

[57] ABSTRACT

The invention is directed to a multifocal surface for a multifocal lens which, for a short progression zone between a far-vision zone and near-vision zone, has a large usable width of this zone and the near-vision zone, and for which the maximum value, which the surface astigmatism reaches on the multifocal surface, is less than the 1.1 multiple of the surface increment. Such a multifocal surface is obtained when this surface is configured as twice continuously differentiable and satisfies a combination of six features which relate to the distribution of surface astigmatism and mean surface refractive power across the multifocal surface.

5 Claims, 5 Drawing Sheets $D_F$ + 5.0 dpt
$\Delta D1$ = 1.0 dpt $D_F$ + 5 dpt
$\Delta D1$ = 1.0 dpt $D_F$ +5 dpt
$\Delta D1$ = 2,0 dpt $D_F$ +5,0 dpt
$\Delta D1$ = 2,0 dpt $D_F$ +5,0 dpt
$\Delta D_1$ = 3,0 dpt $D_F$ +5,0 dpt
$\Delta D_1$ = 3,0 dpt

Fig. 8

$D_F = +5.0$ dpt
$\Delta D1 = 1.0$ dpt 2,114 2,113

2,074 1,809 1,632 1,544 1,542 1,629 1,803 2,065

1,386 1,943 1,591 1,327 1,152 1,064 1,063 1,149 1,321 1,582 1,932 2,373

2,522 1,989 1,548 1,197 ,935 ,761 ,673 ,673 ,758 ,930 1,189 1,538 1,977 2,508

2,214 1,682 1,242 ,892 ,632 ,458 ,371 ,370 ,455 ,626 ,885 1,232 1,670 2,201

2,623 1,996 1,464 1,024 ,675 ,415 ,242 ,155 ,154 ,239 ,410 ,668 1,015 1,453 1,985 2,611

2,497 1,869 1,336 ,895 ,545 ,284 ,112 ,025 ,024 ,109 ,280 ,539 ,887 1,327 1,861 2,490

2,465 1,835 1,299 ,855 ,502 ,240 ,067 ,019 ,020 ,065 ,237 ,498 ,849 1,293 1,831 2,463

3,256 2,527 1,894 1,354 ,906 ,550 ,285 ,109 ,022 ,021 ,107 ,282 ,547 ,904 1,354 1,896 2,533 3,265

3,420 2,687 2,050 1,506 1,053 ,691 ,419 ,239 ,149 ,149 ,238 ,418 ,690 1,054 1,510 2,058 2,701 3,438

2,947 2,305 1,755 1,296 ,926 ,647 ,459 ,365 ,366 ,461 ,649 ,929 1,300 1,763 2,319 2,968

3,307 2,658 2,101 1,634 1,257 ,969 ,774 ,676 ,678 ,778 ,975 1,263 1,642 2,114 2,678 3,335

3,768 3,110 2,545 2,070 1,685 1,390 1,188 1,087 1,090 1,195 1,398 1,694 2,083 2,564 3,137 3,804

3,663 3,089 2,606 2,213 1,911 1,706 1,603 1,606 1,713 1,921 2,225 2,623 3,113 3,697

4,319 3,737 3,245 2,844 2,538 2,331 2,228 2,230 2,338 2,549 2,859 3,265 3,765 4,359

4,490 3,991 3,584 3,275 3,067 2,963 2,965 3,074 3,286 3,601 4,015 4,524

4,439 4,127 3,916 3,811 3,814 3,923 4,139 4,458

4,777 4,780

MULTIFOCAL SURFACE FOR A MULTIFOCAL SPECTACLE LENS

FIELD OF THE INVENTION

The invention relates to a multifocal surface for a multifocal spectacle lens with the surface being configured as twice continuously differentiable.

BACKGROUND OF THE INVENTION

A multifocal spectacle lens has a surface which effects the desired refractive power progression of the spectacle lens with this surface being characterized as a multifocal surface. This multifocal surface can be arranged at the object side or eye side and is supplemented by the second lens surface. The optical effect of this second lens surface, the refractive index of the lens material and the thickness thereof together with the multifocal surface determine the dioptric effect of the spectacle lens. The spectacle lens must be such that the ametropia of the user is optimally corrected.

Multifocal lenses are known for many years and are offered by several manufacturers. The multifocal lens of the applicant herein offered under the designation "GRADAL HS" is exemplary and is described in U.S. Pat. No. 4,606,622.

A further multifocal lens is known from U.S. Pat. No. 3,687,528. This lens has an umbilical meridian, that is, along a meridian, which partitions the multifocal surface into nasal and temporal regions, the surface astigmatism has the value 0. Because of this and other limiting features, the width of the near-vision portion, over which the surface astigmatism remains <0.5 dpt, is small so that the user is forced to turn the head when looking toward the side even at small viewing angles.

Further multifocal lenses are described in the article of G. Guilino et al entitled "Neue progressive Flächen", journal DOZ, No. 11 of Nov. 20, 1980, pages 20 to 23. As shown in illustration 6 on page 23, the surface astigmatism laterally of the meridian and above all in the region of the progressive zone rapidly reaches such high values that these regions cannot be used for clear vision.

The multifocal lens known from U.S. Pat. No. 4,606,622 satisfies in each region all monocular and binocular requirements corresponding to the particular visual tasks as to sharp definition and compatibility.

SUMMARY OF THE INVENTION

It is an object of the invention to provide a multifocal surface which has a wider progression zone while maintaining the characteristics essential and known from U.S. Pat. 4,606,622 and for which the maximum value which the surface astigmatism reaches on the multifocal surface is smaller.

This object is solved by the multifocal surface of the invention which is configured to be twice continuously differentiable and has a far-vision zone, a near-vision zone and a progression zone disposed therebetween, with a mean surface refractive power between +3.0 dpt and +7.0 dpt in the far-vision zone, with an increase of the mean surface refractive power in the progression zone by a surface increment $\Delta D1$ between +0.75 dpt and +3.0 dpt up to the near-vision zone and with a non-umbilical principal viewing line, which traces a curve from the far-vision zone to the near-vision zone with the curve being swung toward the nose and partitioning the multifocal surface into a nasal region and a temporal region. The multifocal surface of the invention includes the following combination of features (a) the near-reference point $B_N$ lies at most 21 mm below the far-reference point $B_F$ with the point $B_N$ being offset with respect to $B_F$ corresponding to the trace of the principal viewing line between 2 and 3.5 mm (b) in the far-vision region, starting from a point G which lies 7 mm below the far-reference point $B_F$ and up to a spacing of 25 mm, the following applies: that the surface astigmatism is <0.5 dpt for all points where $\phi > 45 - 30/\Delta D1$ with the angle $\phi$ being measured with reference to the horizontal at a point which is 4 mm perpendicularly below the far-reference point $B_F$;

(c) 75% of the surface increment $\Delta D1$ is reached along a distance of at most 10 mm on the principal viewing line in the progression zone;

(d) in the progression zone, the width thereof is everywhere at least $5/\Delta D1$ mm for a surface astigmatism <0.5 dpt;

(e) at the elevation of the near-reference point $B_N$, the width of the near-vision zone is at least $7 + 9/\Delta D1$ mm for a surface astigmatism <0.5 dpt; and, (f) in the overall region of the multifocal surface, starting from a point G which is 7 mm below the far-reference point $B_F$ up to a distance of 25 mm, the surface astigmatism is $1.1 \times \Delta D1$ dpt.

The following proceeds on the premise that the multifocal surface is twice continuously differentiable and the important characteristics are determined by the mean surface refracting power:

$$D = \frac{n-1}{2} \cdot \left( \frac{1}{r_1} + \frac{1}{r_2} \right)$$

and the surface astigmatism:

$$\left| (n-1) \left( \frac{1}{r_1} - \frac{1}{r_2} \right) \right|$$

($r_1$, $r_2$ = primary radii of curvature measured in meters in order to maintain the values in diopters) at all points of the multifocal surface The surface is completely determined if mean surface refractive power and surface astigmatism are known for each point of the surface In the multifocal surface according to the invention, the features (b) and (f) are limited to a lens diameter of 50 mm which corresponds to a visual angle of approximately 40°. Only rarely are there viewing movements of the eye which exceed this lens diameter so that lens regions lying outside of this diameter are of no practical importance for viewing.

The combination of features of the multifocal surface of the invention can be fulfilled for a multifocal surface whose mean surface refractive power in the far-vision zone lies between +3.0 dpt and +7.0 dpt and which, in the near-vision zone, has a surface increment $\Delta D1$ of between 0.75 dpt and +3.0 dpt; that is, for all conventionally prescribed additions. The surface increment $\Delta D1$ is defined as the difference of the mean surface refractive power DN at the near-reference point and the mean surface refractive power DF at the far-reference point. With the given mean surface refractive powers of the multifocal surface, spectacle lenses can be produced by corresponding selection of the second lens surface with the spectacle lens having a dioptric effect lying between −6 dpt and +5 dpt. Possible astigmatic errors of the user eye are corrected by utilizing a second lens surface of toric configuration.

The combination of the above features (a) to (f) can then be fulfilled for a multifocal surface which is configured to be twice continuously differentiable and has the other characteristics delineated above directly in advance of the features (a) to (f).

Feature (a) fixes the position of the reference points determined for the normal use of the spectacle lens and all computations are referred to these reference points. Feature (b) considers the fact that the magnitude of the disturbance-free far-vision zone reduces in connection with increased surface increments and provides the technician with the clear indication how to hold this region optimally large while fulfilling the remaining features without a value of the surface astigmatism of $\geq 0.5$ dpt impermissibly reducing the vision in this region. At the same time, the technician obtains the indication as to where the corresponding boundary line of the surface astigmatism lies.

Feature (c) provides an essential indication as to the length of the progression zone whereas feature (d) provides the width of the progression zone in dependence upon the surface increment AD1.

Feature (e) provides the width of the near-vision zone in technician knows which width is to be obtained in each case and can carry out his computations correspondingly.

Feature (f) provides which maximum value of the surface astigmatism can be tolerated over the entire range of the multifocal surface in dependence upon the surface increment $\Delta D1$ so that the technician can correspondingly conduct his optimization computations.

In the multifocal surfaces or multifocal lenses known from the state of the art, individual ones of the features (a) to (f) are fulfilled; however, not all features together Only by fulfilling all features (a) to (f), a multifocal surface and thereby a multifocal lens can be provided which guarantees to the user optimal visual characteristics under all use conditions which usually develop in correspondence to the required surface increment of the user.

The individual features of the combination of features (a) to (f) can be changed in order to obtain improvements of the multifocal surface.

Thus, in the far-vision zone, starting from a point G which is 7 mm below the far-reference point $B_F$ up to a distance of 25 mm, the surface astigmatism for all points having $\phi_1 > 40-30/\Delta D1$ is less than 0.5 dpt. Also, in the overall region of the multifocal surface, starting from a point G which lies 7 mm below the far-reference point $B_F$ up to a distance of 25 mm, the surface astigmatism is $< \Delta D1$ dpt. And, in another embodiment, the near-reference point $B_N$ is displaced 2.5 mm nasally.

To compute the multifocal surface, a starting surface is first selected which can, for example, proceed from the multifocal surface known from U.S. Pat. No. 4,606,622 Preferably, the surface is illustrated in splines as known from the text of H. Späth entitled "Spline-Algorithmen zur Konstruktion von glatten Kurven und Flächen", second edition, R. Oldenbourg-Verlag Munich - Vienna 1978. This spline representation affords the advantage that the surface is twice continuously differentiable and therefore is without jumps or discontinuities ab initio. Thereafter, a plurality of points within the surface is so selected that the features (a) to (f) can be controlled at these points. In these points, the surface astigmatism and the mean surface refractive power is computed for the starting surface and this computation is compared to the index values which result from the features (a) to (f). In this way, differences result and the technician changes the parameters of the spline representation until the requirements are fulfilled; that is, until the index values are reached at the selected points. These targeted changes of the parameters are achieved with the aid of an optimization program. Such programs are available in the marketplace (for example, code five) or are derivable by the technician from the algorithms shown, for example, in the text entitled "Practical Optimization" Academic Press, Inc. 1981. The multifocal surface computed in this manner therefore fulfills the requirements derivable from the features (a) to (f).

In the multifocal surface according to the invention, the primary viewing line is not configured as an umbilical line, that is, surface astigmatism exists along this line but does not exceed values of 0.5 dpt.

The computation of the multifocal surface according to the invention can be carried out such that in addition to the features (a) to (f), also additional requirements can be fulfilled. For example, the requirement can be fulfilled that points having the same horizontal distance from the main viewing line and equal elevation can have the same values of surface astigmatism and mean surface refractive power. Furthermore, the computation can be so conducted that the spectacle lens produced by adding the second lens surface fulfills the conditions which are required for a pleasant binocular viewing with reference to prismatic directional differences.

A multifocal lens configured with a multifocal surface according to the invention is characterized by a short optimally wide progression zone and an optimally wide near-vision zone so that the user can carry out most usual seeing tasks of his daily work without additional rotations of the head caused by a usable viewing region which is all too small. Furthermore, the condition is achieved by the short progression zone that for the usual seeing tasks, the head has to be dropped or raised only slightly.

The reduced surface astigmatism of the new multifocal surface generates a correspondingly small astigmatism of oblique bundles in the edge regions for the wearer of the spectacles and thereby provides a correspondingly reduced blurring and a harmonic distortion.

The manufacture of the multifocal surface according to the invention is possible with the aid of numerically coded machining tools. Such tools are available in the marketplace. It is possible to produce spectacle lenses with multifocal surfaces according to the invention from inorganic or organic material. The production from organic material can, for example, use the known technology of cast molding.

BRIEF DESCRIPTION OF THE DRAWINGS

The invention will be more carefully explained with respect to the embodiments shown in the drawings wherein the surface refractive power $D_F$ for the distance amounts for all illustrated multifocal surfaces to +5.0 dpt and wherein.

DESCRIPTION OF THE PREFERRED EMBODIMENTS OF THE INVENTION

FIGS. 2 to 8 are all illustrated for a diameter of the multifocal surface of 50 mm which corresponds to an approximate viewing angle of 40°.

Figure 2:
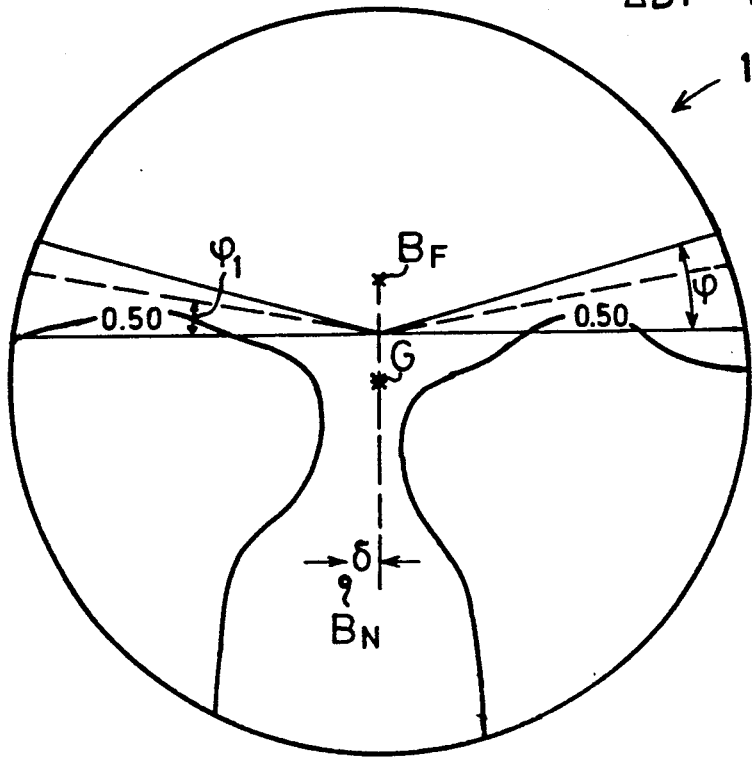
FIG. 2 is a schematic showing the surface astigmatism for a multifocal surface having a surface increment $\Delta D1 = 1.0$ dpt.
Figure 4:
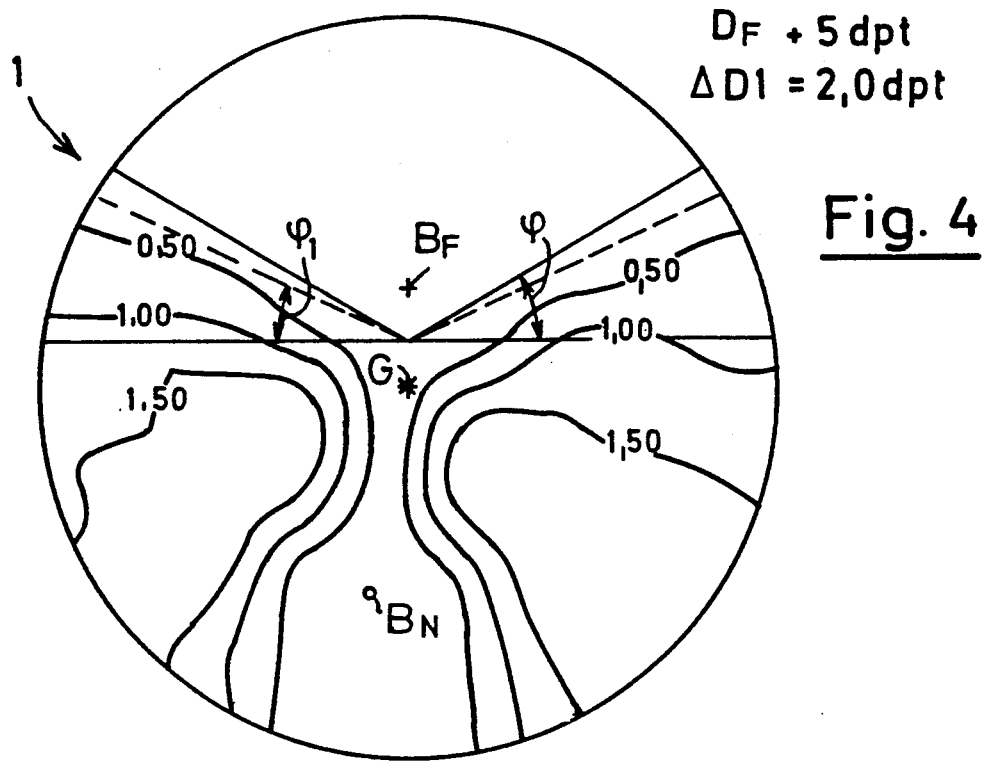
FIG. 4 is a schematic showing the surface astigmatism for a multifocal surface having a surface increment $\Delta D1 = 2.0$ dpt.
Figure 6:
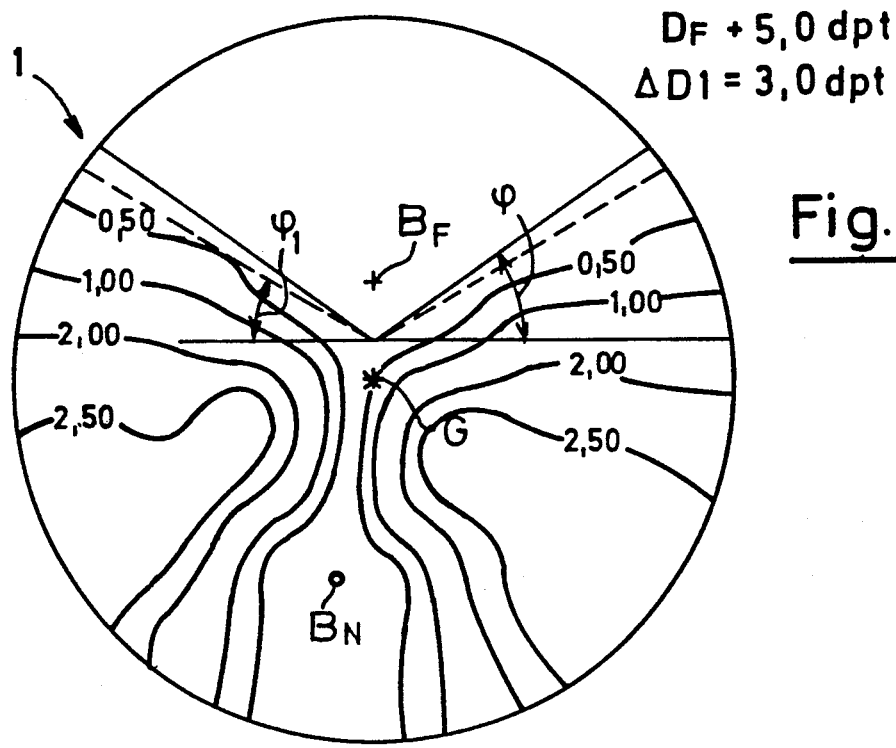
FIG. 6 is a schematic showing the surface astigmatism for a multifocal surface having the surface increment $\Delta D1 = 3.0$ dpt.

The representation of the surface astigmatism in FIGS. 2, 4 and 6 is so configured that starting from the line along which a surface astigmatism of 0.5 dpt is present, further lines are shown along which the surface astigmatism has increased in each case by 0.5 dpt; that is, the illustrated lines show values of surface astigmatism of 0.5 dpt, 1.0 dpt, 1.5 dpt etc.

Figure 3:
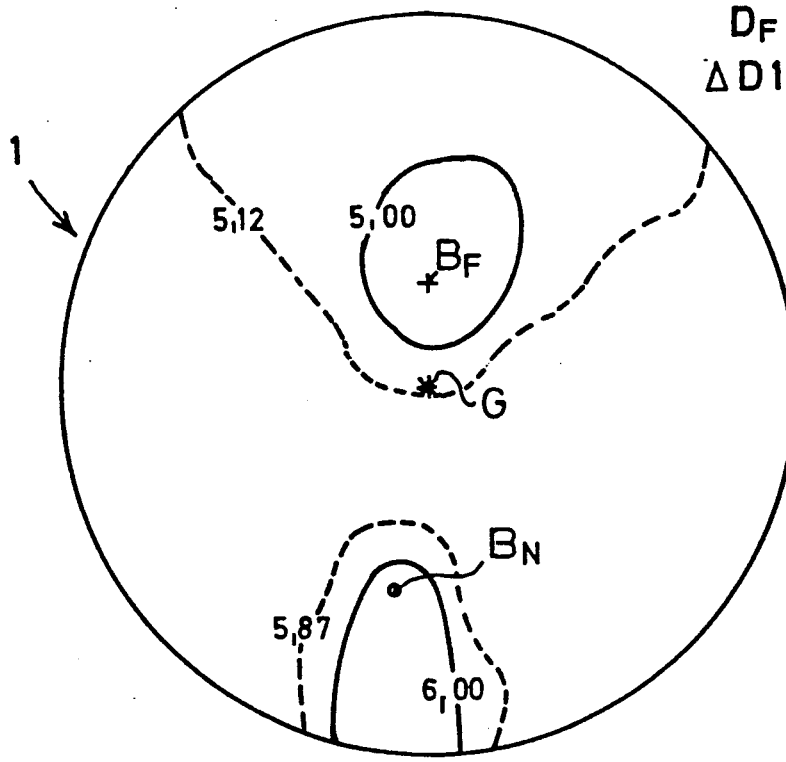
FIG. 3 shows the mean surface refractive power for the surface of FIG. 2.
Figure 5:
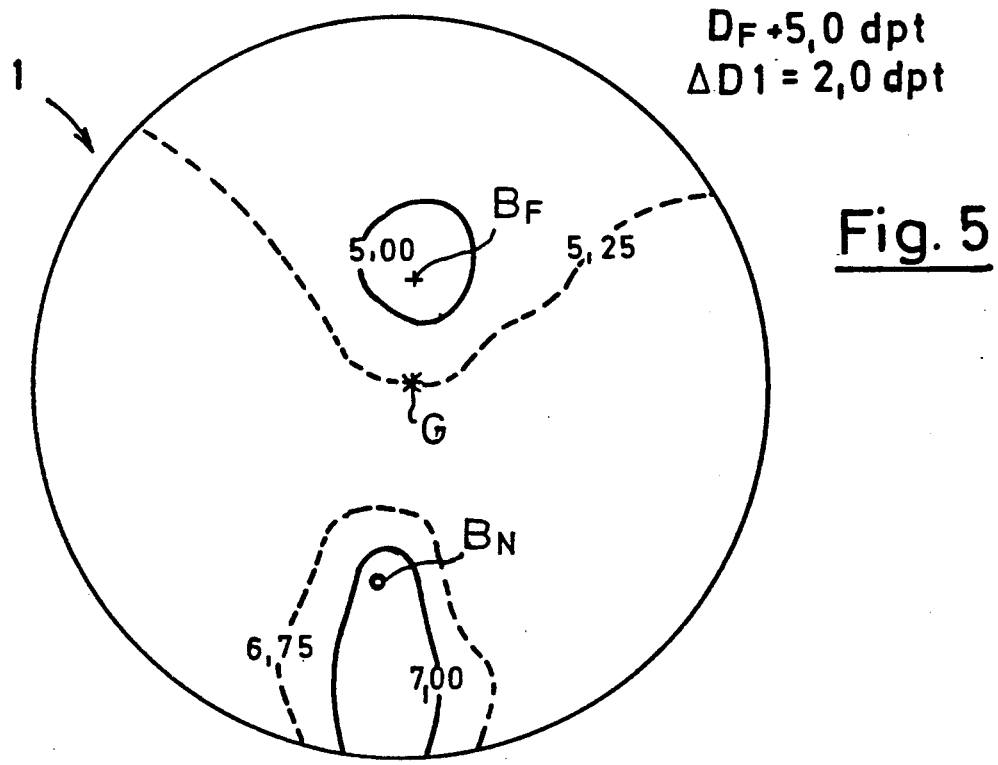
FIG. 5 is a schematic showing the mean surface refractive power for the surface of FIG. 4.
Figure 7:
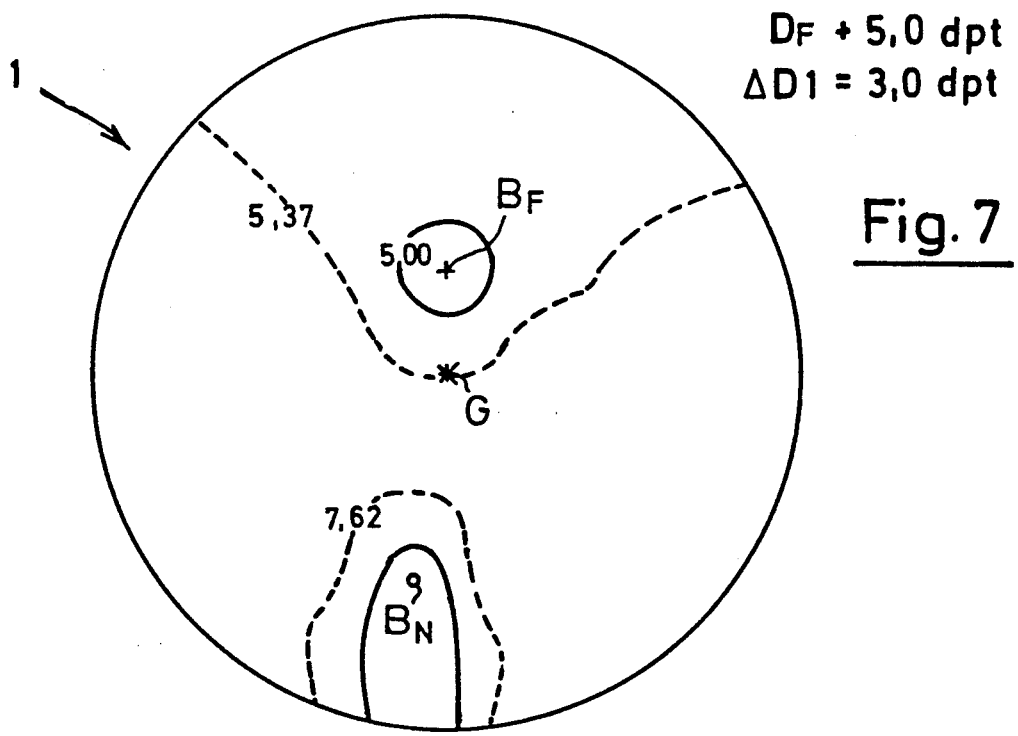
FIG. 7 is a schematic showing the mean surface refractive power for the surface of FIG. 6; and, FIG. 8 is an elevation representation of a multifocal surface having the surface increment $\Delta D1 = 1.0$ dpt referred to a plane.

The illustration of the mean surface refractive power in FIGS. 3, 5 and 7 is so configured that each of the lines is shown broken between which the difference of the surface increment amounts to 75% of $\Delta D1$.

Figure 1:
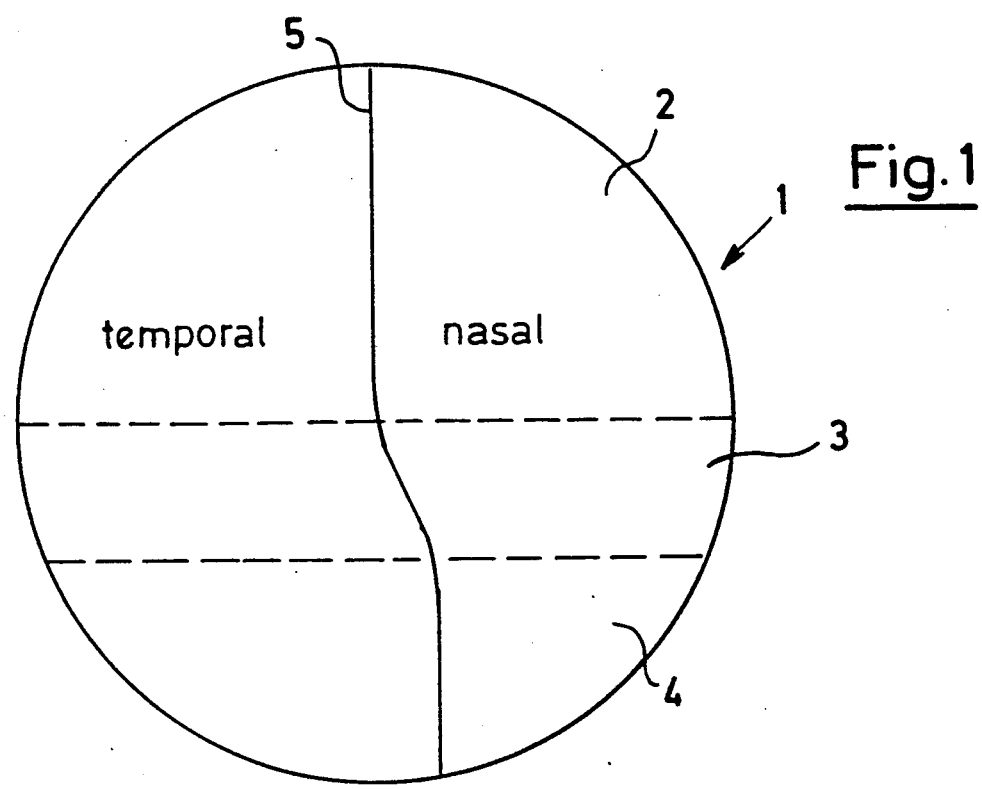
FIG. 1 is a multifocal surface in plan view.

FIG. 1 shows a multifocal surface 1 which has a far-vision zone 2 in its upper portion. The progression zone 3 extends from the far-vision zone 2 and passes over into the near-vision zone 4. If the imagined eye of the user behind the spectacle lens 1 looks through the far-vision zone 2 straight ahead to a point infinitely far away, then the pass-through point of the viewing ray in the far-vision zone 2 lies on the line 5. If the object point, with a dropping movement of the eyes, comes closer to the eye up to the near-vision distance, then the pair of eyes goes through a converging movement. The pass-through point of the viewing beams follows the curve 5 which in the following is referred to as the main viewing line. This line partitions the spectacle lens 1 into a nasal and a temporal region, that is, the computation of the multifocal surface is referred to the main viewing line 5. In this way, a multifocal spectacle lens which has the multifocal surface on the eye or object side, is a so-called unsymmetrical lens, that is, the lenses for the right and the left eye of the user are different. Such a lens is, compared with a symmetrical lens (wherein in lieu of the main viewing line a straight perpendicular meridian is used), more complex in production but offers the decisive advantage that it does not have to be rotated when seated into the spectacle frame. In this way, the optical relationships of the multifocal spectacle lens after being seated in the frame are unchanged with respect to the computation.

The illustrations of FIGS. 2 to 8 are each referred to a spectacle material having the refractive index $n = 1.5251$. The surface refractive power DF for the distance of the multifocal surface amounts in each case to $+5.0$ dpt.

In FIG. 2, the far-reference point is identified by $B_F$ and the near-reference point by $B_N$. A point is designated as the geometric center G which lies 7 mm below the far-reference point $B_F$. The near-reference point $B_N$ lies 14 mm below this geometrical center G. The near-reference point $B_N$ is displaced by the amount of $6 = 2.5$ mm with reference to the far-reference point $B_F$.

FIG. 2 shows the line along which the surface astigmatism reaches a value of 0.5 dpt. The value of the surface astigmatism of 1.0 dpt is not shown since the corresponding line lies outside of the diameter shown of 50 mm.

In FIG. 2, the angle $\phi$ is also shown which is mentioned in feature (b) recited above. One recognizes that the surface astigmatism for all points having $\phi > 15°$ lies below 0.5 dpt. The surface astigmatism also lies below this value for a value of the angle $\phi_1$ when, in the far-vision zone, starting from a point G which is 7 mm below the far-reference point $B_F$ up to a distance of 25 mm, the surface astigmatism for all points having $\phi_1 > 40-30/\Delta D1$ is less than 0.5 dpt.

It is evident from FIGS. 2 and 3, that 75% of the surface increment $\Delta D1$ can be reached on a length of approximately 9 mm in the progression zone with the length of the progression zone itself amounting to 14 mm. The minimal width of the progression zone is more than 5 mm. The width of the near-vision zone is $>16$ mm at the elevation of the near-reference point $B_N$.

A multifocal surface is shown in FIGS. 4 and 5 for which the surface increment $\Delta D1$ amounts to $+2.0$ dpt. One recognizes from the illustration of FIG. 4 that values of the surface astigmatism of 2.0 dpt again lie outside of the illustrated diameter and that in the far-vision zone for an angle $\phi$ of 30° as well as for an angle $\phi_1$ of 25°, the surface astigmatism lies below the value of 0.5 dpt.

75% of the surface increment $\Delta D1$ is reached with a length of approximately 9 mm in the progression zone. The progression zone itself has a width which is greater than 2.5 mm for a surface astigmatism $<0.5$ dpt at each location. The width of the near-vision zone for a surface astigmatism $<0.5$ dpt is greater than 12 mm measured at the elevation of the near-reference point $B_N$.

The multifocal surface of FIGS. 2 and 3 is shown in FIG. 8 as an elevation representation with reference to a plane. In this representation, the trace of the principal viewing line 5 is shown. The grid raster is 3 mm.

FIGS. 6 and 7 show a multifocal surface according to the invention for a surface increment $\Delta D1$ of $+3.0$ dpt. From FIG. 6, it is evident that also in this example the surface astigmatism remains below a value of 0.5 dpt for an angle of 35° and for an angle $\phi_1$ of 30°.

FIG. 7 shows that 75% of the surface increment $\Delta D1$ is reached with a length of approximately 9 mm in the progression zone. The progression zone itself has at all locations a minimum width of $>2$ mm for a surface astigmatism of $<0.5$ dpt. The width of the near-vision zone for a surface astigmatism $<0.5$ dpt is greater than 10 mm at the elevation of the near-reference point $B_N$.

FIGS. 2, 4 and 6 also show that in the overall region of the multifocal surface up to a diameter of 50 mm, that is up to a viewing angle of approximately 40°, the surface astigmatism is less than $1.1 \times \Delta D1$ and does not reach even values of $1.0 \times \Delta D1$.

The above embodiments refer to a multifocal surface which is applied to the object side. The above considerations have to be modified correspondingly when multifocal surface is applied to the eye side.

It is understood that the foregoing description is that of the preferred embodiments of the invention and that various changes and modifications may be made thereto without departing from the spirit and scope of the invention as defined in the appended claims.

What is claimed is:

1. A multifocal surface, which is configured to be twice continuously differentiable, having a far-vision zone (2) a near-vision zone and a progression zone disposed therebetween, with a mean surface refractive power between +3.0 dpt and +7.0 dpt in the far-vision zone, with an increase of the mean surface refractive power in the progression zone (3) by a surface increment AD1 between +0.75 dpt and +3.0 dpt up to the near-vision zone (4) and with a non-umbilical principal viewing line (5), which traces a curve from the far-vision zone to the near-vision zone with the curve being swung toward the nose and partitioning the multifocal surface (1) into a nasal region and a temporal region, the multifocal surface comprising the following combination of features:

(a) the near-reference point $B_N$ lies at most 21 mm below the far-reference point $B_F$ with the point $B_N$ being offset with respect to $B_F$ corresponding to the trace of the principal viewing line 5 between 2 and 3.5 mm nasally;

(b) in the far-vision region, starting from a point G which lies 7 mm below the far-reference point $B_F$ and up to a spacing of 25 mm, the following applies: that the surface astigmatism is <0.5 dpt for all points where $\phi > 45 - 30/\Delta D1$ with the angle $\phi$ being measured with reference to the horizontal at a point which is 4 mm perpendicularly below the far-reference point $B_F$;

(c) 75% of the surface increment $\Delta D1$ is reached along a distance of at most 10 mm on the principal viewing line (5) in the progression zone (3).

(d) in the progression zone (3), the width thereof is everywhere at least $5/\Delta D1$ mm for a surface astigmatism <0.5 dpt;

(e) at the elevation of the near-reference point $B_N$, the width of the near-vision zone (4) is at least $7 + 9/\Delta D1$ mm for a surface astigmatism <0.5 dpt; and, (f) in the overall region of the multifocal surface (1), starting from a point G which is 7 mm below the far-reference point $B_F$ up to a distance of 25 mm, the surface astigmatism is $< 1.1 \times \Delta D1$ dpt.

2. The multifocal surface of claim 1, wherein: the far-vision zone (2), starting from a point G which is 7 mm below the far-reference point $B_F$ up to a distance of 25 mm, the surface astigmatism for all points having $\phi_1 > 40 - 30/\Delta D1$ is less than 0.5 dpt.

3. The multifocal surface of claim 1, wherein: in the overall region of the multifocal surface (1), starting from a point G which lies 7 mm below the far-reference point $B_F$ up to a distance of 25 mm, the surface astigmatism is $< \Delta D1$ dpt.

4. The multifocal surface of claim 1, wherein: the near-reference point $B_N$ is displaced 2.5 mm nasally.

5. A spectacle lens comprising a multifocal surface configured according to claim 1.

* * * * *

UNITED STATES PATENT AND TRADEMARK OFFICE
CERTIFICATE OF CORRECTION

PATENT NO. : 5,137,343
DATED : August 11, 1992
INVENTOR(S) : Gerhard Kelch, Hans Lahres and Helmut Wietschorke It is certified that error appears in the above-identified patent and that said Letters Patent is hereby corrected as shown below:

In the title page, under "References Cited": delete "4,934,808  6/1990  Kitani ............. 251/169" and substitute therefor
-- 4,934,808  6/1990  Kitani ............. 351/169 --.

In column 2, line 2: after "features", insert -- : --.

In column 2, line 7: after "mm", insert -- nasally; --.

In column 2, line 27: between "is" and "1.1 x $\Delta D1$ dpt", insert -- < --.

In column 2, line 46: after "surface" (first occurrence), insert -- . --.

In column 2, line 64: delete "AD1" and substitute -- $\Delta D1$ -- therefor.

In column 2, line 65: delete "DN" and substitute -- $D_N$ -- therefor.

UNITED STATES PATENT AND TRADEMARK OFFICE
CERTIFICATE OF CORRECTION

PATENT NO. : 5,137,343

DATED : August 11, 1992

INVENTOR(S) : Gerhard Kelch, Hans Lahres and Helmut Wietschorke

It is certified that error appears in the above-identified patent and that said Letters Patent is hereby corrected as shown below:

In column 2, line 66: delete "DF" and substitute -- $D_F$ -- therefor.

In column 3, line 27: delete "AD1" and substitute -- $\Delta D1$ -- therefor.

In column 3, line 29: between "in" and "technician", insert -- dependence upon the surface incremented $\Delta D1$, that is, the --.

In column 3, line 39: after "together", insert -- . --.

In column 3, line 61: after "4,606,622", insert -- . --.

In column 5, line 66: delete "DF" and substitute -- $D_F$ -- therefor.

In column 6, line 6: delete "6 = 2.5" and substitute -- $\delta = 2.5$ -- therefor.

UNITED STATES PATENT AND TRADEMARK OFFICE
CERTIFICATE OF CORRECTION

PATENT NO. : 5,137,343

DATED : August 11, 1992

INVENTOR(S) : Gerhard Kelch, Hans Lahres and Helmut Wietschorke

It is certified that error appears in the above-identified patent and that said Letters Patent is hereby corrected as shown below:

In column 6, line 52: between "angle" (first occurrence) and "of" (first occurrence), please insert -- $\phi$ --.

In column 6, line 67: between "when" and "multifocal", insert -- the --.

In column 7, line 9: between "zone (2)" and "a" (first occurrence), please insert -- , --.

In column 7, line 14: delete "AD1" and substitute -- $\Delta$D1 -- therefor.

In column 8, line 5: delete "zone (3)." and substitute -- zone (3); -- therefor.

Signed and Sealed this

Twelfth Day of October, 1993

Attest:

BRUCE LEHMAN

*Attesting Officer*　　　*Commissioner of Patents and Trademarks*